United States Patent [19]
Karn

[11] 3,793,201
[45] Feb. 19, 1974

[54] STABILIZED BASIC MAGNESIUM SULFONATE COMPOSITIONS

[75] Inventor: Jack Lee Karn, Cleveland Heights, Ohio

[73] Assignee: The Lubrizol Corporation, Wickliffe, Ohio

[22] Filed: Dec. 28, 1970

[21] Appl. No.: 102,089

[52] U.S. Cl................ 252/33.4, 44/51, 44/DIG. 3, 252/39, 252/42.7, 252/400
[51] Int. Cl. .......................... C10m 1/40, C10l 1/24
[58] Field of Search..... 252/33.4, 39, 33, 400, 42.7; 44/51, DIG. 3

[56] References Cited
UNITED STATES PATENTS

| | | | |
|---|---|---|---|
| 2,920,105 | 1/1960 | Klinge et al. | 252/33.4 |
| 3,388,063 | 6/1968 | Allphin | 252/33.4 |
| 3,539,633 | 11/1970 | Piasek et al. | 252/33.4 |
| 2,957,908 | 10/1960 | Wiley et al. | 252/33.4 |
| 3,539,511 | 11/1970 | Sabol et al. | 252/33.4 |
| 3,036,003 | 5/1962 | Verdol | 252/42.7 |
| 3,242,079 | 3/1966 | McMillen | 252/42.7 |
| 3,272,743 | 9/1966 | Norman et al. | 252/42.7 |
| 3,272,746 | 9/1966 | LeSuer et al. | 252/42.7 |
| 3,368,971 | 2/1968 | Retzloff et al. | 252/42.7 |
| 3,474,035 | 10/1969 | Dadura | 252/42.7 |

Primary Examiner—Daniel E. Wyman
Assistant Examiner—I. Vaughn
Attorney, Agent, or Firm—James W. Adams, Jr.; Daniel W. Hall

[57] ABSTRACT

Solutions of basic magnesium salts of organic acids in organic diluents are made more resistant to the formation of insoluble films on their surfaces during exposure to the atmospheric conditions on standing by incorporating therein metal salts of bridged phenols. For example, concentrated solutions of basic magnesium sulfonates or carboxylates in mineral oil are made more resistant against the formation of surface films when stored in the presence of moisture by incorporating therein neutral or basic calcium salts of alkylated phenol-formaldehyde condensation products. In addition, the presence of at least one high molecular weight carboxylic acid or derivative thereof with the metal salt of the bridged phenol also assists in stabilizing these solutions against the formation of surface films, insoluble precipitates, haze, and the like.

13 Claims, No Drawings

STABILIZED BASIC MAGNESIUM SULFONATE COMPOSITIONS

This invention relates to concentrated solutions of oil-soluble basic magnesium salts of organic acids in substantially inert non-polar organic liquids. More specifically, this invention is concerned with concentrated solutions of oil-soluble basic magnesium salts of organic acids in substantially inert non-polar organic liquids in which there is also present in the dispersion one or more oil-soluble metal salts of bridged phenols.

U.S. Pat. Nos. 2,920,105 and 2,957,908 disclose the use of calcium and magnesium salts of "coupled" or "bridged" phenols as being useful in preventing the formation of surface films on organic liquid solutions of basic magnesium sulfonates. However, these patents require the addition of very large amounts of the metal salts of the coupled phenol in order to prevent the formation of oil-soluble films on the surface of the solution. Thus, U.S. Pat. No. 2,957,908 requires that there be at least 1 molar portion of metal from the metal salt of coupled phenol per 10 molar portions of magnesium in the basic magnesium sulfonate. In fact, at least 1 molar portion of metal from the coupled phenol per 5 molar parts of magnesium from the basic magnesium sulfonate is preferred.

It has now been discovered that such large amounts of the calcium or magnesium salt of the coupled phenol are not necessary to prevent the formation of surface films and to otherwise stabilize concentrated solutions of oil-soluble basic magnesium salts of organic acids in substantially inert, nonpolar organic liquid against deterioration upon exposure to normal atmospheric conditions upon standing; for example, under routine storage conditions. Indeed, it has been found that the ratio of metal contributed by the metal salts of the bridged phenols to that contributed by the basic magnesium sulfonates can be a very low ratio and still the desired result can be achieved. Thus, according to the present invention, the equivalent ratio of metal contributed by the basic magnesium salt of the organic acid to that contributed by the metal salt of the bridged phenol can vary within the range of about 150:1 to about 30:1.

It is a principal object of this invention to provide stabilized, concentrated solutions of oil-soluble basic magnesium salts of organic acids in substantially inert non-polar organic liquids wherein the solutions also contain minor amounts of oil-soluble metal salts of bridged phenols. Another object is to provide concentrated solutions of oil-soluble basic magnesium salts of organic acids in lubricating oils in which the concentrates also contain minor amounts of oil-soluble metal salts of bridged phenols. Another object is to provide concentrates of lubricating oils, particularly mineral lubricating oils, containing oil-soluble basic magnesium salts of sulfonic acids, carboxylic acids, or mixtures of these in which the concentrate also contains a minor amount of a metal salt of a bridged phenol, particularly barium, calcium, or magnesium salts of bridged phenol or a mixture of two or more of such salts. A still further object is to provide a method for improving the ability of concentrated solutions of oil-soluble basic magnesium salts of organic acids to resist the formation of oil-insoluble films on their surfaces when exposed to the atmosphere (water, air, heat, cold, etc.) upon standing. The manner in which these and other objects of this invention can be achieved will become apparent from the following detailed description of the present invention.

Broadly speaking, these and other objects of the invention can be accomplished by providing concentrated solutions comprising (A) from about 10 percent to about 60 percent by weight of substantially inert non-polar organic liquid, (B) oil-soluble basic magnesium salts of at least one organic acid, and (C) oil-soluble metal salts of bridged phenols, the amount of (B) and (C) being such that the equivalent ratio of metal contributed to said composition by (B) to that contributed by (C) falls within the range of about 150:1 to about 30:1. The method for improving the ability of concentrated lubricating oil solutions of oil-soluble basic magnesium salts of organic acids to resist the formation of oil-insoluble films on their surfaces during storage involves incorporating (C) into such a concentrate comprising (A) and (B) observing the concentrations of each component given above. As used herein the term "solution" is intended to include true solutions as well as stable colloidal dispersions.

The substantially inert non-polar organic liquid component, (A), of the concentrated solutions and concentrates of this invention will generally be a lubricating oil. It can be a mineral lubricating oil, a synthetic lubricating oil such as a polyester, a halogenated hydrocarbon, or a polyalkylene glycol synthetic lubricating oil, or a mixture of any two or more of these. However, other substantially inert non-polar organic liquids which are not normally regarded as lubricating oils such as aliphatic hydrocarbons, chlorinated hydrocarbons, ethers, and the like may be used. Examples of these include hexane, heptane, octane, nonane, chlorohexane, cyclohexane, cyclopentane, ethylcyclohexane, benzene, toluene, xylene, chlorobenzenes, methoxybenzenes, and the like. Various petroleum fractions such as kerosene, diesel fuel, gasoline, petroleum ether, and the like can also be used as the substantially inert non-polar organic liquid component of the compositions of this invention. Obviously, mixtures of two or more of any of the foregoing non-polar liquids are also suitable.

The "oil-soluble" basic magnesium salts of organic acids, that is, component (B) are well-known in the art as are methods for their preparation. Suitable magnesium overbased organic acids and processes for their preparation are disclosed in U.S. Pat. Nos. 2,585,520; 2,739,124; 2,889,279; 2,895,913; 2,920,105; 2,957,908; 3,149,074; 3,150,089; 3,235,494; and 3,492,230. For the sake of brevity, these patents are expressly incorporated herein by reference for their disclosure of suitable basic magnesium salts of organic acids and processes for their preparation. A detailed description of the preparation of oil-soluble basic magnesium salts of various organic acids is found in commonly assigned co-pending application Ser. No. 858,875 filed Sept. 17, 1969, of which applicant is a co-inventor. This co-pending application is expressly incorporated herein by reference for its disclosure of various processes for preparing oil-soluble basic magnesium salts of organic acids as well as a variety of such salts. Preferably, the oil-soluble basic magnesium salts of the compositions of this invention will be basic magnesium salts of sulfonic acids or carboxylic acids or mixtures of two or more of these. These basic magnesium salts may be characterized by metal ratios of about 1.1 to about 30 or more but generally will have made ratios of at least 2 and up to about 20.

The terminology "bridged phenols," as used in the present specification and claims, is intended to describe that class of phenols represented by the following general formula:

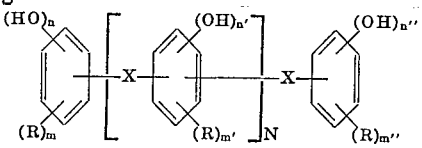

Formula I wherein $n$, $n'$, and $n''$ are each independently integers of 1–3 but preferably 1; R, R', and R'' are each independently aliphatic hydrocarbon groups such as alkyl or alkenyl of at least four carbon atoms each and usually six to forty carbon atoms each; $m$, $m'$, and $m''$ are each independently integers of 0–3 but preferably 1 or 2; N is an integer of 0–10 but usually 0–5; and X is a divalent bridging radical. The divalent bridging radical usually will be a lower alkylene radical of up to seven carbon atoms, and particularly methylene; or a divalent sulfur radical of the general formula $-S_z-$ where $z$ has an average value of 1 to 10, usually 1 to 4. The bridging radical can also be a divalent amino-containing radical of the formulae such as

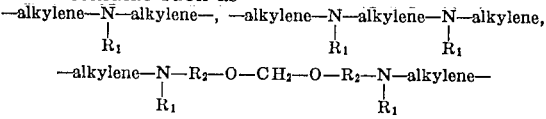

where the alkylene radicals are lower alkylene, usually methylene, $R_1$ is hydrogen or lower alkyl, and $R_2$ is a divalent hydrocarbon radical having up to seven carbon atoms, usually alkylene.

These bridged phenols and their neutral and basic metal salts are old and can be prepared by many conventional processes as shown by the following U.S. Pat. Nos. which are expressly incorporated herein by reference for their disclosure of the preparation of various bridged phenols and their metal salts: 3,474,035; 3,454,497; 3,429,812; 3,336,226; 3,057,800; 3,014,868; 3,259,551; 2,957,908; 2,920,105; 2,833,719; 2,736,701; 2,725,358; 2,680,097; 2,647,873; 2,459,114; 2,459,113; 2,410,911; 2,375,222; 2,340,036; 2,280,419; and 2,250,188.

The preferred metal salts of bridged phenols are those selected from the class of neutral and basic metal salts of the condensation products of aliphatic hydrocarbon-substituted phenols and lower aliphatic aldehydes containing up to seven carbon atoms. The aliphatic hydrocarbon substituents on the phenols used in preparing such condensation products should provide a total of at least four aliphatic carbon atoms per molecule of phenol and preferably, a total of at least six aliphatic carbon atoms per molecule. Each aliphatic hydrocarbon substituent may contain from about four to about 40 or more aliphatic carbon atoms but generally will contain from about six to about 30 aliphatic carbon atoms. The aliphatic aldehyde used in the formation of these phenolaldehyde condensation products is preferably formaldehyde or an equivalent material such as formalin or paraformaldehyde. Other suitable aldehydes include acetaldehyde, crotonaldehyde, butyraldehyde, propionaldehyde, and the like. Examples of the preparation of the metal salts of phenol-aldehyde condensation products is found in many of the above-incorporated patents, for example, Pat. No. 2,647,873.

The neutral and basic metal salts of sulfurized aliphatic hydrocarbon-substituted phenols i.e., those corresponding to Formula I above wherein the divalent bridging group is $-S_z-$, are also very desirable for use in the present invention. Examples of the preparation of such salts are also found in the above-incorporated patents.

The metal cations of the salts of the bridged phenols may be an alkali or alkaline earth metal cation or a zinc, cadmium, lead, iron, nickel, cobalt, copper, chromium, or tin cation or mixtures of these. Preferably, the cation will be a polyvalent metal cation, especially an alkaline earth metal cation. The most preferred salts are the neutral or basic barium, calcium, or magnesium salts of bridged phenols, particularly the neutral or basic calcium salts of the above-described phenolaldehyde condensation products and sulfurized aliphatic hydrocarbon-substituted phenols.

Generally, the metal ratio of the metal salts of the bridged phenols will be from about 1 to about 5. Because of the case of preparation and ready availability those having metal ratios of about 1 to about 2.5 will usually be employed.

The terminology "metal ratio" as used herein with reference to the metal salts of the bridged phenols and the oil-soluble basic magnesium salts of organic acids is intended to define the ratio of equivalents of metal actually present in the bridged phenol or basic magnesium salt relative to the number of equivalents which would be present in the normal salt. A normal salt is one in which there is one equivalent of metal for each equivalent of phenol or acid. That is, a normal salt has a metal ratio of one whereas a basic salt would have a metal ratio in excess of one. A normal salt of a bridged phenol contains one equivalent of metal per hydroxyl group present in the phenol. A basic salt has more than one equivalent of metal per hydroxyl group, for example from about 1.1 to about 4 equivalents of metal per hydroxyl group. Likewise, a normal magnesium salt of an organic acid has one equivalent of metal per equivalent of acid group.

The number of equivalents of a particular metal varies according to its valence. Thus, alkaline earth metals have two equivalents per gram atomic weight, alkali metals have one equivalent per gram atomic weight, zinc has two equivalents per gram atomic weight, etc. The number of equivalents in a bridged phenol depends upon the number of hydroxyl groups present therein. For example, a bridged phenol having an average of two hydroxyl groups per molecule has two equivalents per molecule. Similarly, the number of equivalents present in an organic acid depends upon the average number of acid groups present in the molecules of that acid. A monosulfonic acid or a monocarboxylic acid has one equivalent per molecule; disulfonic acids and dicarboxylic acids have two equivalents per molecule; etc.

The solutions of the present invention are in the form of concentrated solutions in that the substantially inert non-polar organic liquid only comprises from about 10 to about 60 percent by weight of the total weight of the solution. These concentrated solutions usually contain from about 25 to about 55 percent by weight of the substantially inert non-polar liquid diluent such as a mineral oil, petroleum distillate fuel, or other organic liquid diluent as described hereinbefore. The remainder of the solution consists of oil-soluble basic magnesium salts of one or more organic acids, oil-soluble metal salts of one or more of the bridged phenols, and optionally, other conventional additives for lubricants or fuels such as are briefly discussed hereinafter. These concentrated solutions or "concentrates" as they are often described are used widely in the industry for obvious reasons. After storage and/or shipment, they can be mixed with lubricating oils or normally liquid fuels, to prepare lubricating compositions or fuel compositions containing the desired amounts of the basic magnesium salts of the organic acids.

Ordinarily, the oil-soluble basic magnesium salt of the organic acid will comprise at least about 1 percent by weight of the total weight of the concentrated solution and usually at least about 5 percent by weight of the total weight of the solution. The basic magnesium salts may comprise up to about 70 percent by weight of the total weight of the concentrated solutions of this invention.

The amount of metal salt of the bridged phenols present in the concentrated solutions primarily depends upon the amount of metal in the solution contributed by basic magnesium salt and the metal content of the particular metal salt of bridged phenol employed. As stated above, the amount of basic magnesium salt of organic acid and metal salt of bridged phenol must be such that the equivalent ratio of metal contributed by basic magnesium salt to that contributed by the metal salt of bridged phenol falls within the range of about 150:1 to about 30:1 and usually 120:1 to about 40:1. In those concentrated solutions or concentrates containing basic magnesium salts of sulfonic or carboxylic acids or mixtures of these and calcium or magnesium salts of aliphatic hydrocarbon-substituted phenol-formaldehyde condensation products, a particularly useful range of equivalents is from about 100:1 to about 60:1.

All that is required to prepare the concentrated solutions of this invention is to mix the indicated components in the amounts specified hereinbefore. Usually, the procedures used for preparing oil-soluble basic magnesium salts of organic acids results in the formation of a solution of the oil-soluble metal salt in a substantially inert non-polar organic liquid such as mineral oil. Accordingly, the concentrated solutions of this invention are readily prepared simply by adding the requisite quantity of metal salt of bridged phenol to such solutions. The necessary amount of metal salt of bridged phenol can also be incorporated into the reaction mixture in which the basic magnesium salts are to be prepared so that the basic magnesium salts are formed in situ in the presence of the metal salts of the bridged phenols.

The following examples illustrate the preparation of basic magnesium salts of organic acids, metal salts of bridged phenols, the preparation of concentrated solutions of the type contemplated by the present invention from these materials. Unless otherwise indicated, all parts and percentages refer to parts by weight and percent by weight of total composition.

EXAMPLE 1

A. A reaction mixture comprising 1044 grams (about 1.5 equivalents) of an oil solution of an alkylphenyl sulfonic acid (average molecular weight - 500), 1,200 grams of mineral oil, 2400 grams of xylene, 138 grams (about 0.5 equivalents) of tall oil acid mixture (oil-soluble fatty acid mixture sold by Hercules under the name PAMAK-4), 434 grams (20 equivalents) of magnesium oxide, 600 grams of methanol, and 300 grams of water is carbonated at a rate of 6 cubic feet of carbon dioxide per hour at 65°–70°C. (methanol reflux). The carbon dioxide introduction rate was decreased as the carbon dioxide uptake diminished. After 2.5 hours of carbonation, the methanol is removed and by raising the temperature of the mixture to about 95°C. with continued carbon dioxide blowing at a rate of about two cubic feet per hour for one hour. Then 300 grams of water is added to the reaction mixture and carbonation was continued at about 90°C. (reflux) for about four hours. The material becomes hazy with the addition of the water but clarifies after 2–3 hours of continued carbonation. The carbonated product is then stripped to 160°C. at 20 mm. (Hg) pressure and filtered. The filtrate is a concentrated oil solution (47.5 percent oil) of the desired basic magnesium salt, the salt being characterized by a metal ratio of about 10.

B. Following the general procedure of (A) but adjusting the weight ratio of methanol to water in the initial reaction mixture to 4:3 in lieu of the 2:1 ratio of (A), another concentrated oil-solution (47.5 percent oil) of a basic magnesium salt is produced. This methanol-water ratio gives improved carbonation at the methanol reflux stage of carbonation and prevents thickening of the mixture during the 90°C. carbonation stage.

C. (1) A reaction mixture comprising 135 parts mineral oil, 330 parts xylene, 200 parts (0.235 equivalent) of a mineral oil solution of an alkylphenylsulfonic acid (average molecular weight – 425), 19 parts (0.068 equivalent) of the above-described mixture of tall oil acids, 60 parts (about 2.75 equivalents) of magnesium oxide, 83 parts methanol, and 62 parts water are carbonated at a rate of 15 parts of carbon dioxide per hour for about 2 hours at the methanol reflux temperature. The carbon dioxide inlet rate is then reduced to about 7 parts per hour and the methanol is removed by raising the temperature to about 98°C. over a 3 hour period. Then 47 parts of water are added and carbonation is continued for an additional 3.5 hours at a temperature of about 95°C. The carbonated mixture is then stripped by heating to a temperature of 140°–145°C. over a 2.5 hour period. This results in an oil solution of a basic magnesium salt characterized by a metal ratio of about 10.

C. (2) Then, the carbonated mixture is cooled to about 60°–65°C. and 208 parts xylene, 60 parts magnesium oxide, 83 parts methanol and 62 parts water are added thereto. Carbonation is resumed at a rate of 15 parts per hour for 2 hours at the methanol reflux temperature. The carbon dioxide addition rate is reduced to 7 parts per hour and the methanol is removed by raising the temperature to about 95°C. over a 3 hour period. An additional 41.5 parts of water are added and carbonation is continued at 7 parts per hour at a temperature of about 90°–95°C. for 3.5 hours. The carbonated mass is then heated to about 150°–160°C. over a 3.5-hour period and then further stripped by reducing the pressure to 20 mm(Hg) at this temperature. The carbonated reaction product is then filtered. The filtrate is a concentrated oil-solution (31.6 percent oil) of the desired basic magnesium salt characterized by a metal ratio of 20.

D. A thoroughly agitated mixture comprising 232 parts (0.33 equivalent) of an oil-solution of alkylated benzene sulfonic acid (average molecular weight - 500) 410 parts mineral oil diluent, 100 parts xylene, 72 parts (3.33 equivalents) magnesium oxide, 50 parts heptylphenol, 80 parts methanol, and 50 parts water is carbonated by blowing $CO_2$ through the mixture while maintaining the methanol reflux temperature until the $CO_2$ uptake substantially ceases. While carbonation is continued, the temperature is increased to 95°C. to distill off the methanol. An additional 50 parts water is added and the resulting mixture is carbonated an additional 3½ hours at the reflux temperature (about 90°C.). The resulting mixture is filtered and the filtrate stripped to 165°C. at 40 mm(Hg) pressure to produce a concentrated oil solution (33.9 percent oil) of the desired basic magnesium salt which is characterized by a metal ratio of about 8.5.

E. A mixture comprising 277 parts (1 equivalent) of the carboxylic acid mixture of Example 3, 179 parts (8.2 equivalents) magnesium oxide, 179 parts water, 179 parts methanol, 615 parts xylene, and 393 parts mineral oil diluent is carbonated at 60°–70°C. until the $CO_2$ uptake substantially ceases. The methanol distilled off by heating to 95°C. with continued $CO_2$ blowing and 175 parts water are added. Carbon dioxide blowing is continued at 90°–95°C. until the $CO_2$ uptake again substantially ceases. While maintaining the $CO_2$ blowing the carbonated mass is stripped to 160°C. and subsequently filtered. The filtrate is a 40 percent oil solution of the desired basic magnesium salts (metal ratio of 3.8) and is characterized by a sulfate ash content of 23.1 percent.

F. The procedure of (E) is repeated with the following modifications. The amount of xylene is increased to 816 parts and the amount of methanol is increased to 250 parts while the amount of water present in the initial mixture is 125 parts. After removal of the methanol, 50 parts water and 100 parts butyl alcohol are added and carbonation is continued at 80°–84°C. until the $CO_2$ uptake again substantially ceases. After stripping and filtration, a 40 percent oil solution of the desired basic magnesium salt (metal ratio - 3.5) is obtained and is characterized by a sulfate ash content of 21.5 percent.

G. To a mixture comprising 190 parts (0.25 equivalent) of alkylated benzene sulfonic acid, 400 parts xylene, 157 parts mineral oil diluent, 23 parts (0.083 equivalent) of the tall oil acid mixture described above, and 72 parts (3.33 equivalents) magnesium oxide heated to about 50°C. there are added 100 parts methanol and 75 parts water. The temperature is maintained at 50°–60°C. while carbonating via a submerged $CO_2$ inlet line until the $CO_2$ uptake substantially ceases. The methanol is distilled off with continued $CO_2$ blowing and 50 parts water added. The $CO_2$ blowing is continued at a temperature of about 90°C. until the $CO_2$ uptake again substantially ceases. The carbonated mass is then stripped to 160°C. at 25 mm(Hg) pressure. To the stripped mixture there is added 26 parts polyisobutenyl (average molecular weight - 1,000)-substituted succinic anhydride. The resulting mixture is heated at about 160°C. with nitrogen blowing for about one-half hour and filtered. The filtrate is a concentrated oil-solution (35.6 percent oil) characterized by a sulfate ash content of about 37.8 percent and the basic magnesium salt thus produced has a metal ratio of about 9.9.

The purpose of the succinic anhydride is to improve the solubility of the basic magnesium salts, particularly on long-standing in storage, and to improve their water-tolerance capabilities, e.g., their ability not to form emulsions or precipitate in the presence of contaminating amounts of water encountered in storage and use.

In lieu of the polyisobutenyl-substituted succinic acid anhydride other oil-soluble high-molecular weight mono- or polycarboxylic acids, their anhydrides containing about 30–700 aliphatic carbon atoms, and/or acylated nitrogen compounds and esters derived therefrom can be used to improve the lubricating oil and fuel solubility characteristics of the basic magnesium salts of this invention. Preferably, such material used to improve the solubility will contain at least about fifty aliphatic carbon atoms. The "solubility improvers" constitute an art-recognized class of compounds used extensively as detergent-dispersants in lubricants and fuels and/or as intermediates in their preparation. For example, polyolefin-substituted acrylic acids, methacrylic acids, and succinic acids and their equivalent acylating derivatives have been reacted with various amine compounds such as alkylene polyamines, aminoalkyl piperazines, etc., to produce amides and imides used extensively as lubricating oil additives. Similarly, the acylating agents can be reacted with polyhydric alcohols, polyoxyalkylene glycols, etc. to produce esters useful as fuel and lubricant additives. These detergent-dispersants and/or their intermediates are disclosed in such U.S. Pat. Nos. as 3,346,354; 3,341,542; 3,272,746; 3,219,666; 3,216,936; 3,200,107; 3,172,892; 3,288,714; 3,381,022; and 3,331,776, all of which are incorporated herein for the sake of brevity. Preferred solubility improvers are polyisobutenyl-substituted succinic acids or their anhydrides where the polyisobutenyl substituent has an average molecular weight of from about 700 to about 5,000.

While the foregoing examples demonstrate the addition of the anhydride after carbonation and stripping are complete, such solubility improvers can be employed in any step in the procedure from the initial reaction mixture to addition after filtration. In fact, if a tendency to haziness or gelation is encountered, the solubility improver can be employed advantageously at that point (or just prior to that point) in the procedure where the haziness or gelation arises. Ordinarily the solubility improver, if employed, will be used in amounts of from about 0.1 percent to about 20 percent by weight based on the total weight of the composition. Amounts of about 1–10 percent are particularly useful. Obviously, since the solubility improvers are themselves useful lubricant and fuel additives, their presence in the final product is not detrimental to the utility of the basic magnesium salts.

The use of the above described solubility improvers in combination with the metal-salts of bridged phenols described hereinbefore constitutes an especially preferred embodiment of the present invention. Preferred solubility improvers are the high molecular weight mono- and polycarboxylic acids and their anhydrides which are usually prepared by reacting at temperatures of about 100°C. to about 300°C. polymerized 1-monoolefins or chlorinated polymerized 1-monoolefins with ethylenically unsaturated aliphatic mono- and polycarboxylic acids containing up to about twelve aliphatic carbon atoms or their anhydrides. The 1-monoolefins from which these polymers are derived include principally those containing up to eight carbon atoms, e.g., ethylene, propylene, butylene, isobutylene, 1-hexene, and the like. The interpolymers of two or more of these monomers are also useful such as ehtylene-propylene copolymers. The polymerized 1-monoolefins and chlorinated polymerized 1-monoolefins should contain an average of at least about 30 aliphatic carbon atoms and preferably at least 50 aliphatic carbon atoms. Those having average molecular weights of about 700 to about 5,000 are especially useful. Suitable ethylenically unsaturated mono- and polycarboxylic acids and anhydrides include particularly the $\alpha,\beta$-ethylenically unsaturated mono- and polycarboxylic acids and anhydrides such as acrylic acid, methacrylic acid, maleic acid, maleic acid anhydride, fumaric acid, and the like. Other suitable ethylenically unsaturated acids and anhydrides include allyl acetic acid, crotonic acid, 10-decenoic acid, sorbic acid, 2-pentene-1,3,5-tricarboxylic acid, and the like. Polybutenyl-substituted succinic acid anhydride wherein the polybutenyl substituent has an average molecular weight of about 700 to about 5,000 are especially preferred. They are readily prepared by reacting, for example, polyisobutene or chlorinated polyisobutene with maleic acid anhydride. These high-molecular weight carboxylic acids and anhydrides are well-known as established by the above-incorporated patents and no further description is deemed necessary herein.

EXAMPLE 2

To a mixture comprising 125 parts of low viscosity mineral oil and 66.5 parts of heptylphenol heated to about 38°C. there is added 3.5 parts of water. Thereafter, 16 parts of paraformaldehyde are added to the mixture at a uniform rate over 0.75 hour. Then 0.5 parts of hydrated lime are added and this mixture is heated to 80°C. over a 1 hour period. The reaction mixture thickens and the temperature rises to about 116°C. Then, 13.8 parts of hydrated lime are added over 0.75 hr. while maintaining a temperature of about 80°–90°C. The material is then heated to about 140°C. for 6 to 7 hours at a reduced pressure of about 2–8 mm(Hg) to remove substantially all water. An additional 40 parts of mineral oil are added to the reaction product and the resulting material is filtered. The filtrate is a concentrated oil solution (70 percent oil) of the substantially neutral calcium salt of the heptylphenol-formaldehyde condensation product. It is characterized by calcium content of about 2.2 percent and a sulfate ash content of 7.5 percent.

Detailed examples for the preparation of the basic metal salts of bridged phenols are set forth in the above-incorporated patents. U.S. Pat. No. 3,372,116 discloses particularly effective methods for preparing basic calcium salts of sulfurized aliphatic hydrocarbon-substituted phenols (described in that patent as hydrocarbon-substituted phenol sulfides) and for that reason is also incorporated herein by reference.

EXAMPLE 3

An example of an especially preferred concentrated solution of this invention is the oil solution obtained by mixing 88 parts by weight of the concentrated oil solution of Example (C) (1), 5 parts by weight of polyisobutenyl-substituted succinic acid anhydride wherein the polyisobutenyl substituent has an average molecular weight of about 900–1,000, and 7 parts by weight of the filtrate of Example 2.

An example of concentrated solutions of this invention not having the solubility improvers present would be the one of Example 3 in which the polyisobutenyl-substituted succinic acid anhydride was omitted.

Obviously, other embodiments of this invention are readily prepared simply by substituting other basic magnesium salts of the type described hereinbefore for that used in Example 3. Similarly, other metal salts of the bridged phenols may be substituted for the calcium salt of the heptylphenol-formaldehyde condensation product used in Example 3. The additional embodiments require only that the indicated materials be mixed together in the desired portions. Sometimes heating facilitates mixing. Likewise, the use of volatile substantially inert non-polar organic liquids such as benzene, xylene, heptane, and the like can facilitate the mixing. Since the preparation of additional embodiments of the concentrated solution of the present invention is obviously within the capabilities of those of ordinary skill in the art, no purpose would be served by further specific exemplification herein.

In preparing final lubricating oil compositions from the concentrated solutions of this invention, additional lubricating oil will be added to the concentrates to provide a final lubricating oil composition containing a detergent amount of basic magnesium salt of organic acid. The amount of basic magnesium salt necessary to provide detergency in a given lubricating oil will depend upon, for example the metal content of the basic magnesium salt, the presence or absence of other detergents or dispersants in the final lubricating oil composition, and the particular environment in which the lubricant is to be used. Thus, a final lubricating oil composition made from the concentrated solutions of this invention may contain from about 0.01 to about 20 percent by weight of the basic magnesium salts of the organic acids. Usually, the lubricants will contain from about 0.1 to about 10 percent by weight of the basic magnesium salts of organic acid although in particularly harsh environments such as crankcase lubricants for marine diesels, concentration may be as high as 15, 20 percent, or more.

The basic magnesium salts may be used alone or in combination with other dispersants or detergents. In addition, the lubricating composition may contain rust inhibitors, oxidation inhibitors, viscosity index improving agents, extreme pressure additives, and the like. Typical examples of these additional lubricant additives are contained in the aboveincorporated patents.

The additives of this invention can be effectively employed in a variety of lubricating compositions based on diverse oils of lubricating viscosity such as a natural or synthetic lubricating oil, or suitable mixtures thereof. The lubricating compositions contemplated include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions can benefit from the incorporation of the present additives.

Natural oils include animal oils and vegetable oils (e.g., castor oil, lard oil) as well as solvent-refined or acid-refined mineral lubricating oils of the paraffinic, naphthenic, or mixed paraffinic-napthenic types. Oils, of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzene, dinonylbenzenes, di-(2-ethylhexyl)benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1,000, diphenyl ether of polyethylene glycol having a molecular weight of 500–1,000, diethyl ether of polypropylene glycol having a molecular weight of 1,000–1,500, etc.) or mono- and polycarboxylic esters thereof, for example, the acetic acid esters, mixed $C_3$–$C_8$ fatty acid esters, or the $C_{13}$ oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropylsilicate, tetra(2-ethylhexyl)-silicate, tetra(4-methyl-2-tetraethyl)-silicate, tetra-(p-tert-butylphenyl)-silicate, hexyl-(4-methyl-2-pentoxy)-disiloxane, poly(methyl)-siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

In fuels, the basic magnesium salts function as anti-screen-clogging agents, smoke suppressants, vanadium scavengers. They are primarily intended for use in the normally liquid petroleum distillate fuels, that is, the petroleum distillates which boil in the range characteristic of petroleum fuels such as gasolines, fuel oils, diesel fuels, aviation fuels, kerosene and the like. When employed in fuels they are generally present in lower concentrations than in lubricants, for example, in amounts of from about 0.0001 to about 2 percent by weight and generally in amounts of from about 0.001 to about 0.5 percent by weight. As in the case of lubricants, other conventional additives can be present in the fuel compositions contemplated by the present invention. These additional additives include lead scavengers, deicers, antiscreen clogging agents, demulsifiers, smoke-suppressants, and the like.

Basic magnesium salts are old in the art and their many uses as lubricant and fuel additives are well known. The concentrated solutions of basic magnesium salts described herein are intended to be used as the concentrated solutions have been used in the past and are presently used. The U.S. Patents incorporated hereinbefore amply illustrate how basic magnesium salts of organic acids may be used in lubricants and fuels. Accordingly, no further description of their use is required here.

What is claimed is:

1. An oil soluble composition which is a concentrated solution comprising (A) from about 10 to about 60 percent by weight of a substantially inert non-polar organic liquid, (B) oil-soluble basic magnesium salts of at least one organic acid, and (C) oil-soluble polyvalent metal salts of bridged phenols, the amount of (B) and (C) being such that the equivalent ratio of metal contributed to said composition by (B) to that contributed by (C) falls within the range of about 150:1 to about 30:1, and (C) being at least one oil-soluble polyvalent metal salt of an alkylated phenol-formaldehyde condensation product of a lower aliphatic aldehyde containing up to 7 carbon atoms or a sulfurized aliphatic-hydrocarbon-substituted phenol corresponding to the formula

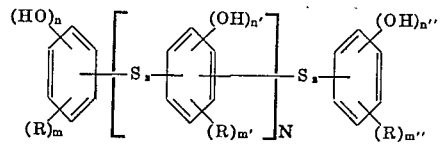

wherein $n$, $n'$ and $n''$ are each independently integers of 1 – 3, each R, is independently an aliphatic hydrocarbon group of at least four carbon atoms, $m$, $m'$ and $m''$ are each independently integers of 0–3, N is an integer of 0–10 and $z$ has an average value of 1–10.

2. A composition according to claim 1 wherein there is also incorporated therein at least one member selected from the group consisting of oil-soluble high molecular weight mono- or polycarboxylic acids or anhydrides containing about 30–700 aliphatic carbon atoms and the esters, or acylated nitrogen derivatives of said acids.

3. A composition according to claim 1 wherein (B) is selected from a group consisting of oil-soluble basic magnesium salts of sulfonic acids, oil-soluble basic magnesium salts of carboxylic acids, or mixtures of these and (C) is selected from the group consisting of oil-soluble neutral and basic alkaline earth metal salts of bridged phenols.

4. A composition according to claim 3 wherein said equivalent ratio falls within the range of about 120:1 to about 40:1.

5. A composition according to claim 4 wherein (C) is a calcium salt of an alkylated phenol-formaldehyde condensation product.

6. A composition according to claim 1 wherein (B) is selected from the class consisting of oil-soluble, carbonated, basic magnesium salts of organic acids.

7. A composition according to claim 6 wherein (A) is a mineral oil.

8. A composition according to claim 7 wherein (B) is an oil-soluble, carbonated, basic magnesium salt of sulfonic acids, oil-soluble, carbonated, basic magnesium salt of carboxylic acids, or mixtures of these wherein said equivalent ratio falls within the range of about 120:1 to 40:1.

9. A composition according to claim 8 wherein (C) is a neutral or basic barium, calcium, or magnesium salt of an alkylated phenol-formaldehyde condensation product.

10. A composition according to claim 1 comprising (A) from about 10 to about 60 percent by weight of mineral oil, (B) oil-soluble basic magnesium salts selected from the class consisting of oil-soluble, carbonated, basic magnesium salts of sulfonic acids or carboxylic acids or mixtures thereof, and (C) oil-soluble polyvalent metal salt of a bridged phenol which is a neutral or basic calcium salt of alkylated phenol-formaldehyde condensation products wherein the alkyl groups contain from six to 40 carbon atoms, the amount of (B) and (C) being such that the equivalent ratio of metal contributed to said composition by (B) relative to that contributed by (C) falls within the range of about 100:1 to about 60:1.

11. A composition according to claim 10 wherein there is also incorporated therein at least one member selected from the group consisting of polyisobutenyl-substituted succinic acids or their anhydrides where the polyisobutenyl substituent has an average molecular weight of from about 700 to about 5000.

12. A method for improving the ability of concentrated oil-solutions of basic magnesium salts of organic acids to resist the formation of lubricating oil-insoluble films on their surfaces when exposed to the atmosphere upon standing, wherein the solutions comprise from about 10 to about 60 percent by weight of lubricating oil, said method comprising incorporating into said solutions at least one oil-soluble polyvalent metal salt of bridged phenols or mixtures thereof, the amount of metal incorporated being such that the amount of metal contained in said basic magnesium salts to that contained in said metal salt of bridged phenols falls within an equivalent ratio of about 150:1 to about 30:1.

13. A method according to claim 12 wherein there is also incorporated therein at least one member selected from the group consisting of oil-soluble high molecular weight mono- or polycarboxylic acid or anhydrides, esters, or acylated amine derivatives of said acid.

* * * * *